June 1, 1937.  G. F. McDOUGALL  2,082,019
HYDRAULIC BRAKE
Original Filed July 1, 1933  2 Sheets-Sheet 2
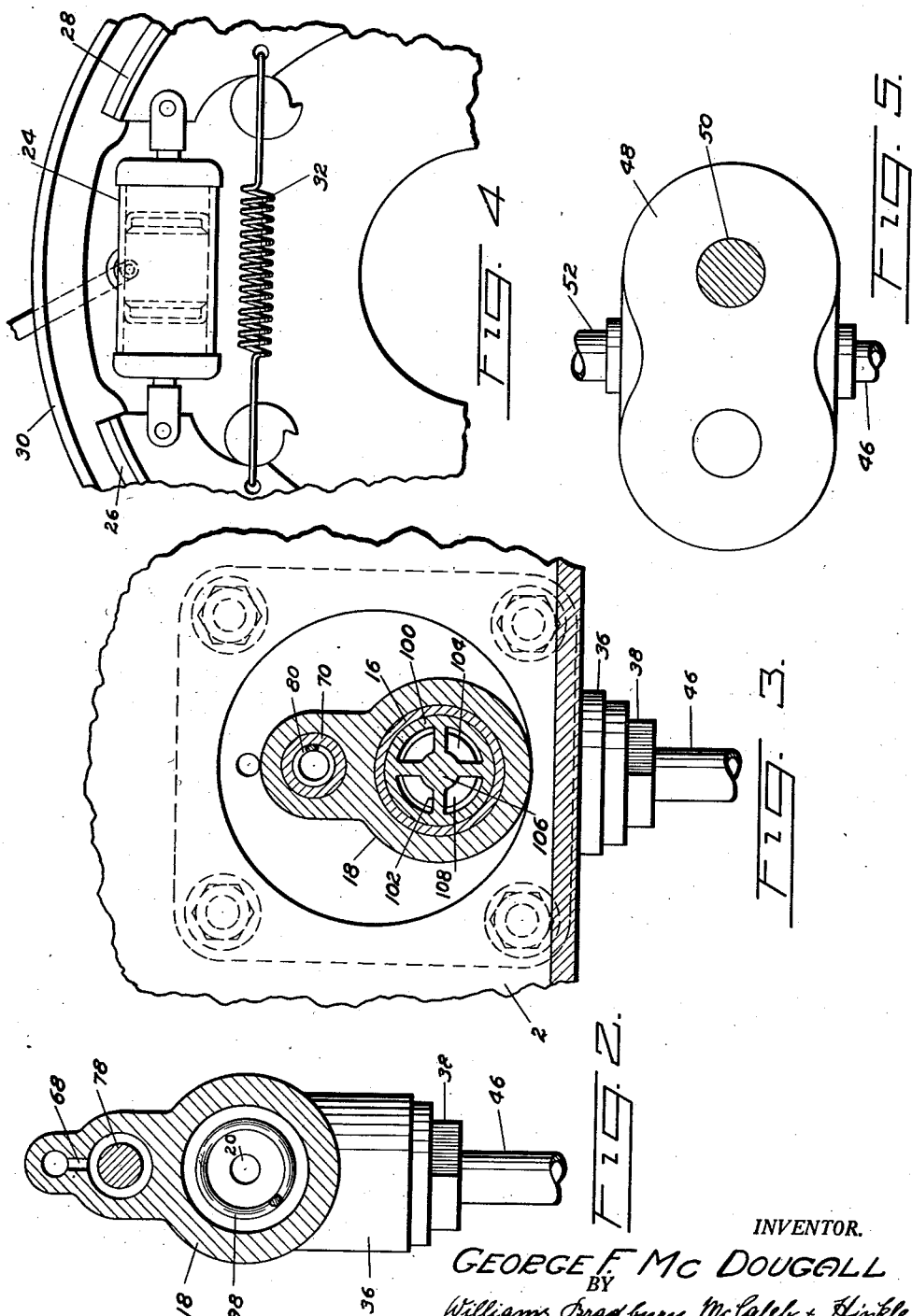
INVENTOR.
GEORGE F. Mc DOUGALL
BY
Williams, Bradbury, McCaleb & Hinkle
ATTORNEYS.

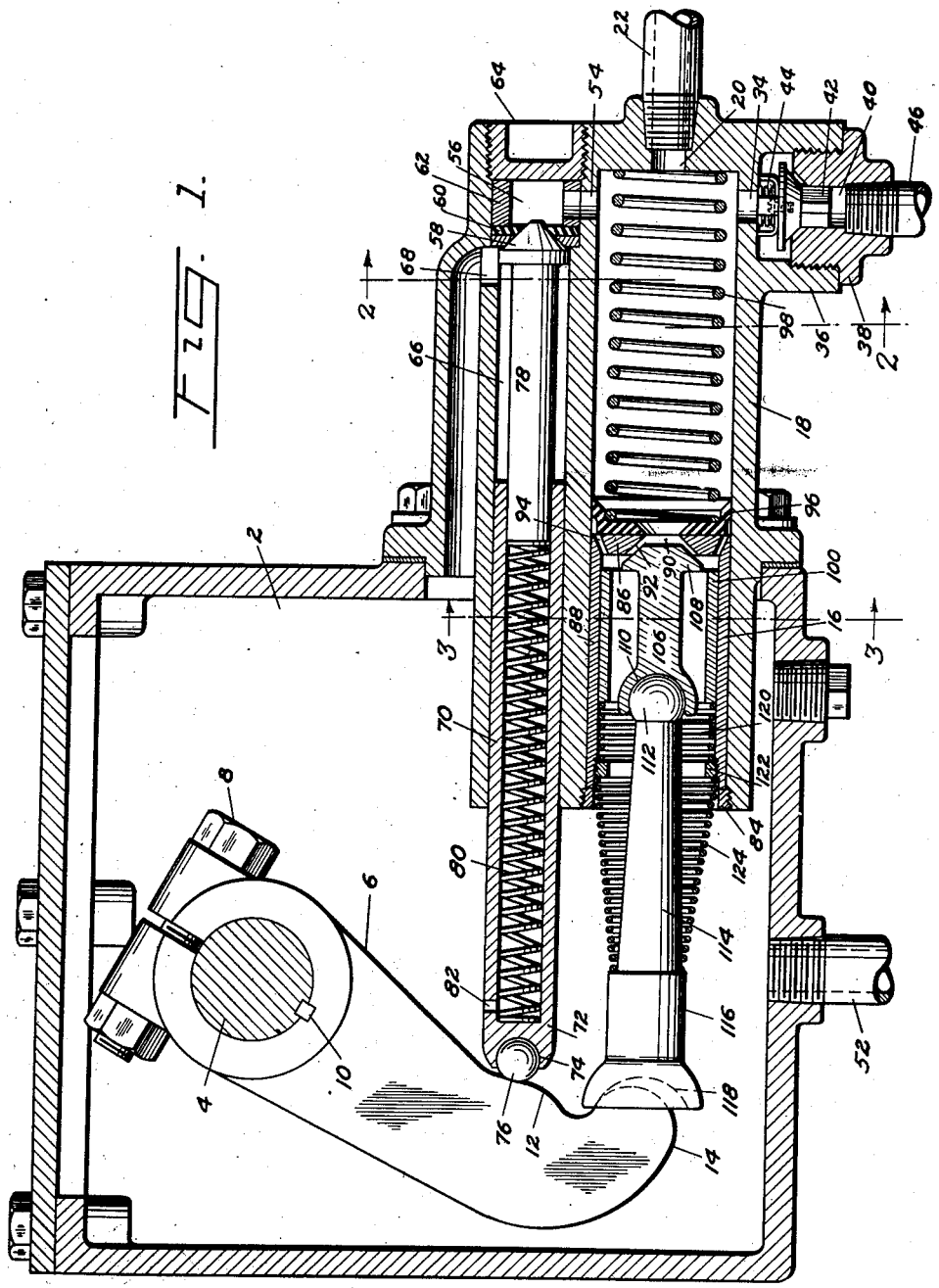

Patented June 1, 1937

2,082,019

UNITED STATES PATENT OFFICE 2,082,019

HYDRAULIC BRAKE

George F. McDougall, Portland, Oreg., assignor to Hydraulic Brake Company, Detroit, Mich., a corporation of California Original application July 1, 1933, Serial No. 678,627. Divided and this application July 27, 1934, Serial No. 737,170

3 Claims. (Cl. 103—178)

This invention relates to hydraulic brakes for motor vehicles.

The present invention is a division of my pending application Ser. No. 678,627, filed July 1, 1933, Patent No. 2,004,078, and is made in accordance with requirements of the United States Patent Office under provision of Rule 42.

The invention comprehends a fluid compression device for producing pressure upon fluid in a brake system, the compression device being operable through a foot pedal lever.

In a preferred embodiment of the invention the fluid compression device is connected in a brake system, and the operation of the device is supplemented by power from the prime mover of the vehicle. The compression device is so constructed and connected in the system that the operator may feel the brake application as it increases in intensity in much the way as an operator appreciates the intensity with which the conventional hydraulic brake is applied when operated solely by the operator's own effort against the resistance encountered.

An object of the invention is to provide a fluid compression device for a brake system including a cylinder and a piston reciprocable in the cylinder to place the fluid in the system under pressure and upon release of the pressure to by-pass the fluid first in one direction and then in another, so that the system may be solidly filled with fluid.

A feature of the invention is a piston having a head provided with a plurality of spaced passages controlled by a collapsible leak-proof cup, and a port controlled by a valve carried by a reciprocable member in the skirt of the piston.

Another feature of the invention is a piston having a port, a valve carried by the piston for cooperation with the port, and a thrust member together with means for supporting the thrust member.

The novel features considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, in which,—

Fig. 1 is a longitudinal sectional view of a master cylinder assembly in the position of at rest, that is, in the initial position when the brakes are not applied and where the pump for furnishing auxiliary power is assumed to be in operation;

Fig. 2 is a transverse sectional view, substantially on line 2—2, Fig. 1;

Fig. 3 is a transverse sectional view, substantially on line 3—3, Fig. 1;

Fig. 4 is a side elevation, partly broken away, of a well-known brake structure including a motor cylinder, friction elements operated thereby, and a rotatable drum for cooperation with the friction elements, and Fig. 5 is a diagrammatical illustration of a pump operable in any convenient manner from the prime mover of a motor vehicle.

Referring to the drawings for more specific details of the invention, 2 indicates a reservoir which under normal conditions stands partly full of liquid. An operating shaft 4, journaled in the side walls of the reservoir, has one end extending outwardly from the reservoir for the attachment of a foot pedal lever, not shown.

The operating shaft 4 has secured thereon within the reservoir a lever 6 secured in position by a bolt 8 and held against relative movement by a key 10. The lever 6 is provided with a lobe 12, the object of which will hereinafter appear, and a rounded end portion 14 serving to transmit the rotary motion of the shaft 4 to a piston 16 movable within a cylinder 18.

The cylinder 18 is suitably mounted on the wall of the reservoir with its open end extending into the reservoir adjacent the bottom thereof. The head of the cylinder has a port 20 connected as by a pipe line or conduit 22 to a brake structure including a motor cylinder 24 having opposed pistons therein connected respectively to the separable ends of friction elements 26 and 28 arranged for cooperation with a rotatable drum 30, and a spring 32 connected between the friction elements serves to return the elements to retracted position and to retain them in this position against suitable stops.

The cylinder 18 has a port 34 adjacent the head of the cylinder. This port communicates with a sleeve 36 in which is threaded a nut 38 having a passage 40 controlled by a valve 42 normally held against its seat by a spring 44. The passage 40 communicates with a pipe line or conduit 46 connected to the outlet of a suitable pump 48, the driving shaft 50 of which may be driven from the prime mover of a motor vehicle, and the inlet of the pump is connected to a pipe line or conduit 52 communicating with a suitable opening in the bottom of the reservoir 2.

The cylinder 18 also has a port 54 adjacent the head of the cylinder. This port communicates with a chamber 56 having in one end thereof a valve seat 58 flanked by a rubber gasket 60, the valve seat and gasket being held in position by a ring 62 fitting snugly in the chamber and secured against displacement as by a plug 64 threaded in the open end of the chamber. The chamber 56 communicates with a cylinder 66 having an open end extending into the reservoir and provided with a port 68 adjacent the valve seat 58 which also communicates with the reservoir.

The cylinder 66 has therein a sleeve 70 having a closed end 72 provided with a recess 74 in which is fitted a ball bearing 76 adapted to engage the lobe 12 on the actuating lever 6. The sleeve 70 has therein a reciprocable valve 78 and a spring 80 for urging the valve against the seat 58. The sleeve 70 is also provided with a port 82 communicating with the reservoir to provide free egress and ingress of liquid within the sleeve to avoid hydraulic resistance and to insure smooth operation of the valve.

The piston 16 is retained in the cylinder 18 by a ring 84 threaded in the open end of the cylinder. The piston includes a head 86 and a cylindrical skirt portion 88. The head has an axial port 90 providing a valve seat 92 and a plurality of spaced passages 94, and positioned on the head 86 is a leak-proof cup 96 held against displacement by a coil spring 98 interposed between the cup and the head of the cylinder. This spring also serves to return the piston to its normal position upon release of pressure in the cylinder.

A cylindrical section 100 reciprocable in the skirt 88 of the piston has an internal spider 102 providing a plurality of passages 104. The spider supports a stem 106 of a valve 108 adaptable for cooperation with the valve seat 92, and the valve stem has a socket 110 in which is seated a ball 112 formed on one end of a rod 114 having on its other end an enlarged portion 116 provided with a recess 118 for the reception of the rounded end portion 14 of the actuating lever 6.

A coil spring 120 is interposed between the cylindrical section 100 and a stop ring 122 threaded in the skirt of the piston. This spring serves to urge the cylindrical section toward the head of the piston, and since the cylindrical section 100 carries the valve 108, the valve is urged toward its seat 92 to close the port 90. Seated on the stop ring 122 is a conical spring 124 wound around the rod 114 and engaging the enlarged portion 116 of the rod so as to support the rod for engagement with the rounded end portion 14 of the actuating lever 6.

In operation, upon depressing a foot pedal lever, not shown, the operating shaft 4 is given a slight rotation to move the actuating lever 6 through an angle resulting in applying force through the connecting rod 114 to move the valve 108 to its seat 92 to close the port 90 in the head of the cylinder and seal off the liquid contained within the cylinder.

Assuming that the prime mover is in operation, and that the pump 48 driven thereby is delivering fluid from the reservoir 2 to the cylinder 18 with the valve 108 closed, pressure will be built up in the cylinder 18, the conduit 22, and the motor cylinders 24, resulting in spreading the friction elements 26 and 28 into engagement with the drum 30 to effectively retard rotation thereof.

The intensity with which the friction elements 27 and 28 are engaged with the drum is dependent upon the load on the spring-pressed valve 78. The initial load on this valve requires substantial pressure to open it, approximately one hundred pounds per square inch in devices of this character used on small vehicles, and two hundred pounds or more per square inch on larger vehicles, it being understood that the motor cylinders 24 generally require about forty to fifty pounds per square inch pressure to overcome the return springs 32 connected between the friction elements 26 and 28.

Upon closing the valve 108 a small additional compression is imposed on the spring 80, and upon further inward movement of the piston 16 in the cylinder 18 the spring 80 is compressed to increase the load on the valve 78 so that a greater degree of intensity of brake application follows directly in proportion to the movement of the brake pedal as in the case of the conventional hydraulic brakes.

It is to be observed that, when the pump is in operation, inward movement of the piston 16 in the cylinder 18 resulting in displacement of fluid and reduction of the area in the cylinder 18, the pressure of the fluid delivered by the pump to the cylinder is greatly enhanced, resulting in an increase of speed with which the friction elements of the brake are brought into frictional engagement with the drum.

It is also to be observed that a large volume of fluid under pressure obviates the necessity of micrometric clearances between the frictional elements and the drum, so that dust, which is generally present, does not affect the brake lining and score the drum.

It is further to be observed that when the pump is in operation an extremely rapid movement of the piston tending to apply the brakes will have much the same effect as is now produced by the operation of hydraulic brakes of the conventional type. However, the increase in intensity is much more rapid than in the conventional type of hydraulic brake.

When pressure is developed in the cylinder 18 in excess of the amount required to open the valve 78, the excess pressure acquired will be relieved by discharge of fluid through the port 54, the chamber 56, past the valve 78, and through the port 68 to the reservoir; hence with the brake pedal held in a given position a fixed amount of pressure will be applied to the brakes regardless of the speed of the prime mover and of the pump operated thereby.

Further inward movement of the piston results in increasing braking pressure in direct proportion to the amount of movement of the piston, the operator, of course, feeling the increase in pressure due to its effect on the piston, which is transmitted directly to the operator's foot through valve 108 and linkage connecting this valve to the operating shaft.

Upon release of the foot pedal lever, the operating shaft 4 rotates slightly and thereby moves the actuating lever 6 to release the applied force on the rod 114, and hence on the valve 108 and the piston 16. With the applied force removed, the piston is returned to its retracted position by the spring 98, resulting in release of pressure in the cylinder 18.

As the piston returns to retracted position, fluid returns to the cylinder from the motor cylinders 24. Movement of the fluid from the motor cylinders 24 to the cylinder 18 is due to pressure on the pistons of the motor cylinders 24 imposed by the retractable springs 32 connecting the friction elements 26 and 28.

Due to friction on the column of fluid in the cylinder 18, the conduit 22, and to the tension of a spring 98, the piston 16 returns to retracted position slightly in advance of the return of the fluid to the cylinder 18. This causes a partial vacuum in the cylinder 18, resulting in a collapse of the cup 96 and admission of fluid from the reservoir through the passage 94 to the cylinder.

Further pressure in the cylinder causes the cup 96 to return to static condition and moves the valve 108 from its seat against the resistance of the spring 120 to open the port 90 in the head 86 of the piston so that excess fluid may be returned through the port 90 to the reservoir 2, it being understood that the spring 120 imposes an initial load of approximately six or eight pounds to the valve 108.

When the fluid has been completely displaced from the motor cylinders, the valve 108 is moved under the influence of the spring 120 to close the port 90 in the head of the piston, the cup 96 having previously returned to static condition, the apparatus is again in operative position. It is, of course, to be understood that the valve 108 is retained in open position when the pump is in operation.

When the prime mover is not in operation, the valves 42, 78 and 108 will be in closed position. Under these conditions, upon actuation of the brake the piston 16 is reciprocated in the cylinder 18 to displace the fluid in the cylinder through the pipe line 22 to the motor cylinders 24, to effectively spread the friction elements 26 and 28 into engagement with the drum 30.

In this operation the valve 78 does not open because of the initial load imposed thereon by the spring 80 and because of the gradual increase of this load in proportion to the movement of the piston within the cylinder. Upon release of applied force on the piston, pressure in the cylinder is released and the piston is returned to its retracted position identically as hereinbefore described.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. In a fluid brake system, the combination of a cylinder, a piston reciprocable therein, said piston having a port, a sleeve reciprocable in the piston, a ring in the piston for retaining the sleeve against displacement, a spring interposed between the ring and one end of the sleeve, a spider in the sleeve, a valve on one end of the spider for coaction with the port in said piston, a rod having pivoted connection with the other end of the spider, a head on the rod, and a spring between the retaining ring and the head.

2. In a fluid brake system, the combination of a cylinder, a piston reciprocable therein, said piston having a port, a sleeve reciprocable in the piston, a ring in the piston for retaining the sleeve against displacement, a spider in the sleeve, a valve on one end of the spider for coaction with the port in said piston, a rod universally connected to the other end of the spider, a spring surrounding said rod and interposed between the ring and one end of the sleeve, a head on the rod, and a centralizing spring between the retaining ring and the head.

3. In a fluid brake system, the combination of a cylinder, a piston reciprocable therein, said piston having a port, a sleeve reciprocable in the piston, an interior abutment in the piston for retaining the sleeve against displacement, a spider in the sleeve, a valve on one end of the spider for coaction with the port in said piston, a rod pivotally connected to the other end of the spider, a spring interposed between said abutment and one end of the sleeve, an abutment on the rod, and a centralizing spring between the said abutments on the rod and piston.

GEORGE F. McDOUGALL.